Jan. 7, 1964   W. D. L. THEED   3,116,897
BRAKING DEVICE ON A VEHICLE
Filed Aug. 26, 1960   2 Sheets-Sheet 1

INVENTOR
WILLIAM D. L. THEED
By
Watson, Cole, Grindle & Watson
ATTORNEYS

United States Patent Office 3,116,897
Patented Jan. 7, 1964

3,116,897
BRAKING DEVICE ON A VEHICLE
William Denis Learoyd Theed, Wargrave, England, assignor to Sir George Godfrey & Partners (Holdings) Limited, Hanworth, England, a company of Great Britain
Filed Aug. 26, 1960, Ser. No. 52,158
Claims priority, application Great Britain Aug. 31, 1959
7 Claims. (Cl. 244—17.17)

This invention relates to a device on a vehicle which can be used as a brake without retarding rotation of the wheels or which can be used as an air bearing device for lifting the vehicle slightly.

According to the present invention a device for a vehicle comprises at least one open sided hollow case and a pump enabling the air pressure in the case, when the open side is closed by the ground or other anchorage, to be different from the atmospheric pressure.

The pump can be arranged to operate as an exhauster enabling the interior of the case to be evacuated.

It is clear that once the open side of the case is closed by the ground and the interior is exhausted the case will be held to the ground by a pull equal to the product of the area of the open side of the case and the difference between atmospheric pressure and the pressure in the case.

Conveniently the pump will be mounted in the vehicle to be capable of control by the occupant so that the brake can be applied and released at chosen moments. In one form of the invention the braking device is coupled to the vehicle through an extensible connection which enables it to be lowered from a raised position clear of the ground into contact with the ground. In the case of a helicopter, to which the invention is particularly applicable, the case may be lowered below the wheels so that contact can be made with the ground and a braking effect or anchoring effect achieved while the wheels may be a foot or more above the ground. This can provide a very valuable steadying effect on a helicopter attempting to land in bad weather conditions or on a moving platform such as an aircraft carrier.

The pump can also be arranged to raise the pressure within the case above atmospheric pressure when the open side is closed by the ground or other anchorage.

It has been found in experiments that if the pressure within the cup can be raised to perhaps five pounds per square inch gauge an air bearing is formed which can lift a light vehicle by a small fraction of an inch from a deck. Once the air bearing is established the vehicle is, of course, very easy to move over the deck. Moreover, establishment of the air bearing for a helicopter whose rotor is rotating can assist take off from the deck by providing additional lift at the most critical moment.

Of course the pump can be used to exhaust or pressurize the interior of the case merely by reversing its action. Thus if the bearing device is used for moving a vehicle, when once the vehicle has reached its new position the case can be evacuated and the vehicle will become anchored.

In the case of a take off of a helicopter the braking device can be in action when the rotor is tending to lift the helicopter and then the vacuum can be released by the pumping of air into the case so that some lift is provided immediately after the anchorage is released to assist in lifting the helicopter. Of course, it is also possible to use a separate source of compressed air.

For the bearing device or the braking device or a combined device there may be two or more open-sided hollow cases at different places on the vehicle. It will usually, of course be arranged that they all act together and for this purpose each may carry one of a number of microswitches which are connected in series in a circuit controlling the operation of the vacuum valves and which are operated by contact of the open sides of the cases with the ground. With this arrangement it can be made impossible to establish a vacuum in any one of the cases until all the cases are in contact with the ground when all can be evacuated at the same moment.

Conveniently the vacuum valves are mounted directly on the cases so that the pipe lines right up to the cases are evacuated and evacuation of the cases themselves can be achieved with a minimum of delay when the valves are opened.

In order to increase the friction between a case and the ground the case may be arranged to be flexible so that a part of it having a rough lining is pressed against the ground by the atmospheric load when the casing is evacuated. This will also assist in reducing the volume of the case and hence the evacuation time.

Conveniently the case has a flexible rim or flexible members in the rim enabling an air seal to be established with an uneven anchorage. Friction members may be incorporated in the open side of the case to increase the coefficient of friction between the case and the anchorage.

The invention may be carried into practice in various ways and one embodiment will now be described by way of example as applied to a braking or anchoring device or an air bearing device for a helicopter. Reference will be made to the accompanying drawings of which—

Figure 1:
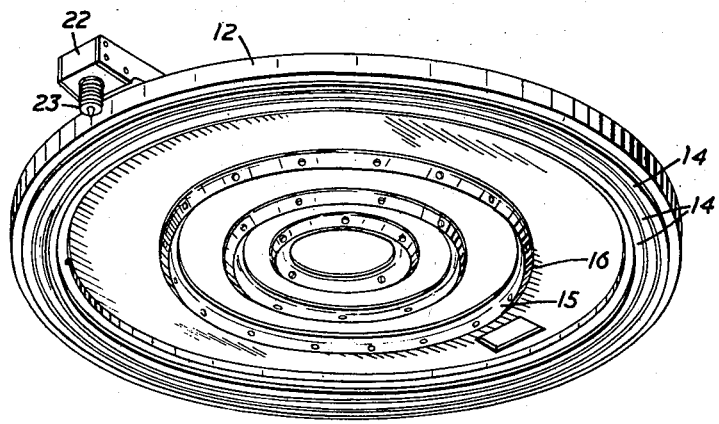
FIGURE 1 is a perspective view from underneath of one of a number of similar units employed.
Figure 2:
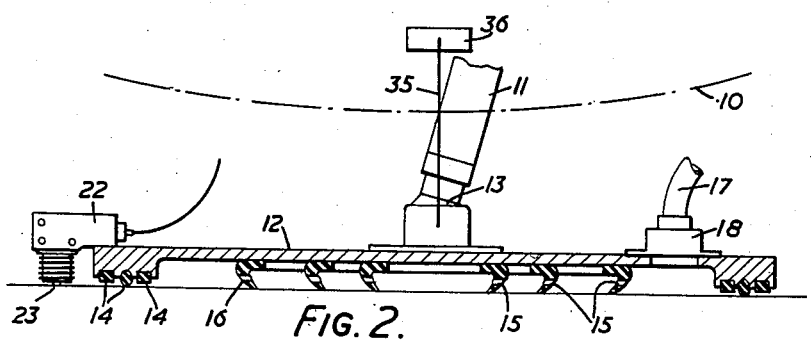
FIGURE 2 is a sectional elevation of the unit of FIGURE 1, with no pressure difference between the interior of the case and atmosphere.

The unit is one of four carried at the ends of legs 11 secured to the helicopter 10. The unit comprises a case 12 which is rather like an inverted soup plate with a diameter of about 12 inches and it is supported from the lower end of the leg 11 through a ball joint 13. The disposition of the legs ensures that when the helicopter is standing on the ground normally, the open sides of the cases 12 are just closed by the surface of the ground.

Around the rim of each case are three rubber sealing rings 14 arranged as a labyrinth seal to enable the case to be sealed to a rough anchorage. The central rubber ring is of oval cross section and the inner and outer rings are of square cross section when undeformed.

Within the case are secured three concentric rings 15 of an abrasive material with downwardly depending flexible rims 16 which when the case is evacuated, provide friction between the anchorage and the case to stop the helicopter sliding.

Figure 3:
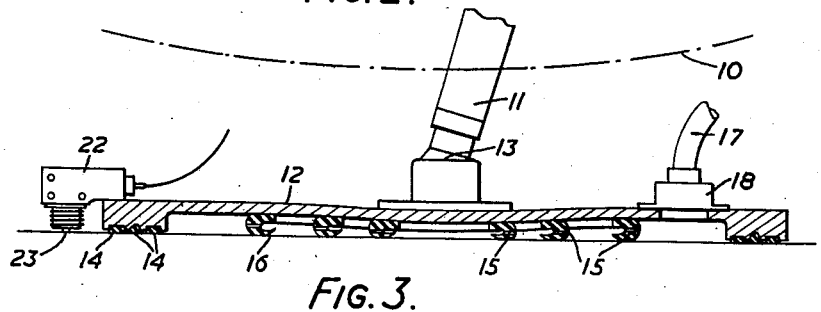
FIGURE 3 is a view corresponding to FIGURE 2 with the interior of the case evacuated.

The interior of the case is connected by way of a flexible connection 17 and a valve 18 to a motor driven pump 21 mounted in the helicopter. In dependence upon the direction of rotation of the motor the interior of the case can be evacuated or can be pressurized to a pressure of perhaps 5 lbs. per square inch above atmospheric pressure. When evacuated, say to a vacuum of about 20 inches of mercury, the case is anchored to the ground by the external atmospheric pressure as shown in FIGURE 3, and, when pressurized, an air bearing is provided which is capable of lifting the helicopter by a small fraction of an inch from the anchorage.

The case also carries a micro switch 22 having an operating member 23 which is only operated to allow the case to be evacuated or pressurized when the rim of the case is in contact with the ground.

Figure 4:
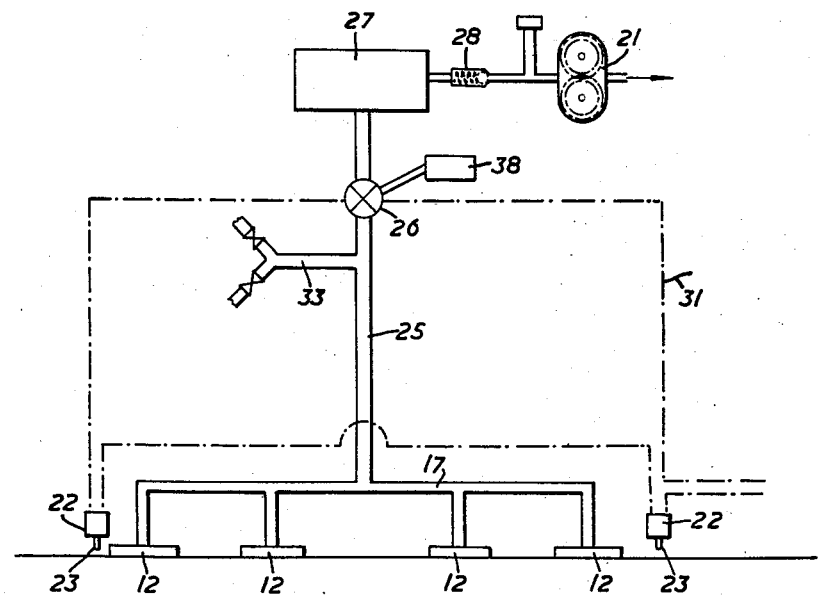
FIGURE 4 is a diagram of the pump system.

The system is shown in FIGURE 4. The four identical cases 12 are connected to a common passage 25 containing an electrically operated valve 26 and leading to a vacuum tank 27 communicating through a non-return valve 28 with the motor driven pump 21.

A pilot-operated switch 31 controls the energization of the valve 26 but the valve cannot be opened until all the micro-switches 22 on the various cases 12 have been closed by contact with the anchorage. There is also a connection downstream of the valve 26 enabling the connection 25 to be connected to a source of pressure or a source of vacuum on the ground as indicated at 33.

The four cases 12 can be used as a brake when the helicopter is on the ground by applying the vacuum as shown in FIGURE 3 so that the atmospheric pressure holds the cases against the ground and the friction rings 15 prevent sliding. For manhandling the helicopter the interiors of the cases 12 may be pressurised to a pressure of say 5 lbs. per square inch above atmospheric pressure so that air bearings are formed which can lift the helicopter from the ground by a small fraction of an inch and allow it to be easily moved.

This air bearing is also useful at take-off and it gives the rotor some assistance at the most critical time—that of first leaving the ground. It is also possible to make a jump start by running up the helicopter rotor so that it would have considerable lift were it not for the brake, and then when the brake is suddenly released the helicopter will be able to rise quickly.

When the helicopter is making a landing on an aircraft carrier great difficulty may be experienced due to rolling of the deck particularly in gusty weather and accordingly a modification is arranged so that when the helicopter is about to land the pilot can release the connection of one of the cases to its leg and lower that case 12 on a cable 35 into contact with the deck while he is hovering above the deck. He can then apply the vacuum so that there will be a pull holding the helicopter to the deck of perhaps 1,000 lbs. and the helicopter could then be lowered by operating a winch 36 to wind in the cable 35.

A quick-release mechanism 38 allows the pilot to release the vacuum in all cases quickly in an emergency.

As has been suggested above, the brakes or air bearings can be used while the helicopter is on the ground by use of the external connection 33 and a portable motor-driven pump.

The valve 26 has been shown diagrammatically in FIGURE 4 but conveniently comprises four valves one on each of the cases 12 and all operated together when the electrical circuit is closed. This means that before evacuating the cases the pipe lines right up to the cases are evacuated and evacuation of the cases themselves can be achieved with a minimum of delay when the valves are re-opened.

It will be seen from FIGURE 3 that the case is somewhat flexible to allow the friction rings 15 to be pressed against the ground by the atmospheric load when the case is evacuated. This also reduces the volume of the case and hence the evacuation time.

What I claim as my invention and desire to secure by Letters Patent is:

1. A helicopter including a normal undercarriage for supporting it from the ground, and an additional undercarriage comprising a number of open sided hollow cases, each individually supported from the helicopter through a universal joint, the open sides of the case being just clos by the ground when the helicopter is standing on the ground on its normal undercarriage, a connection from each case, means in the helicopter selectively operable for evacuating the interior of each case and for supplying air substantially above atmospheric pressure thereinto, quick release valves enabling the pressure within the cases to be rapidly released, deformable walls on the cases enabling the volumes of the cases to be reduced when the interiors are evacuated, friction means in the open sides of the cases for reducing any tendency of the cases to slide over a surface with which they are in contact, and a winch and cable connection between the helicopter and one of the cases enabling the case to be lowered from and raised towards the helicopter and releasable means in the connection from that case to the helicopter.

2. A helicopter including a normal undercarriage for supporting it from the ground, and an additional undercarriage comprising a number of open sided hollow cases, each individually supported from the helicopter through a universal joint, the open sides of the case being just closed by the ground when the helicopter is standing on the ground on its normal undercarriage, a connection from each case, and means in the helicopter for evacuating and alternatively pressurizing the interior of each case to a pressure above atmosphere, quick release valves enabling the pressure within the cases to be rapidly released, deformable walls on the cases enabling the volumes of the cases to be reduced when the interiors are evacuated, and friction means in the open sides of the cases for reducing any tendency of the cases to slide over a surface with which they are in contact.

3. A helicopter as claimed in claim 2 including an external source of pressure and a connection to the interior of the cases enabling them to be pressurized by use of the external source of pressure.

4. A helicopter having an undercarriage including an open sided hollow case supported from the helicopter through a universal joint and arranged to have its open side closed by the ground when the helicopter is standing on the ground, means for evacuating the case, means for pressurizing the interior of the case to a pressure above atmospheric sufficient to support the weight of the helicopter, and alternative means for selecting whether the interior of the case is to be evacuated or pressurized, including also a quick release mechanism for releasing the pressure within the casing.

5. A helicopter as claimed in claim 4 including deformable means on the case enabling its volume to be reduced.

6. A helicopter as claimed in claim 4 including friction means in the open side of the case.

7. A helicopter as claimed in claim 4 including an expansible connection between the helicopter and the case.

References Cited in the file of this patent

UNITED STATES PATENTS

| | | |
|---|---|---|
| 1,698,482 | Nicin | Jan. 8, 1929 |
| 2,101,399 | Larsen | Dec. 7, 1937 |
| 2,593,910 | Morris | Apr. 22, 1952 |
| 2,969,126 | Gardner | Jan. 24, 1961 |

FOREIGN PATENTS

| | | |
|---|---|---|
| 23,640 | Great Britain | Oct. 24, 1906 |
| 409,078 | Germany | Jan. 31, 1925 |